United States Patent

[11] 3,595,368

| | | |
|---|---|---|
| [72] | Inventor | Dante Mantovani<br>Via Sigonio 7, Bologna, Italy |
| [21] | Appl. No. | 855,634 |
| [22] | Filed | Sept. 5, 1969 |
| [45] | Patented | July 27, 1971 |
| [32] | Priority | Feb. 18, 1969 |
| [33] | | Italy |
| [31] | | 1537 A/69 |

[54] DEVICE FOR TRANSFERRING ARTICLES FROM A DELIVERING MEANS TO A RECEIVING MEANS MOVING AT A DIFFERENT SPEED
7 Claims, 5 Drawing Figs.

[52] U.S. Cl. .................................................. 198/25, 198/107
[51] Int. Cl. .................................................. B65g 47/82
[50] Field of Search .......................................... 198/24–25, 76, 85, 40, 107

[56] References Cited
UNITED STATES PATENTS
3,053,375  9/1962  Temple ...................... 198/24

*Primary Examiner*—Edward A. Sroka
*Attorneys*—Guido Modiano and Albert Josif

ABSTRACT: Device for transferring articles, in particular nonaccumulable articles, from a delivery conveyor belt to a receiving conveyor belt parallel therewith, which comprises a rotatable article transferring disc arranged between said conveyors and carrying a plurality of containers near its periphery, pushers operated in coordination with the movement of said conveyor belts to push the articles from the delivery belt into a container or from a container onto the receiving belt and stop means for holding said containers during the action of said pushers.

INVENTOR.
DANTE MANTOVANI

INVENTOR
DANTE MANTOVANI

3,595,368

DEVICE FOR TRANSFERRING ARTICLES FROM A DELIVERING MEANS TO A RECEIVING MEANS MOVING AT A DIFFERENT SPEED

BACKGROUND OF THE INVENTION

This invention relates to a device for transferring articles from a delivering means to a receiving means moving at a different speed. The invention relates particularly to the transfer of nonaccumulable articles.

It is well known that particularly in the packing machine field, a product undergoes operations which being generally different one from the other require different times in the majority of cases. The necessity thus arises of linking machines or operational units of fast working speed to machines or operational units which are slower. It often happens that for one reason or another the machine in operation becomes crowded and, as it cannot operate properly, it has to be stopped. Thus for a corresponding period of time the machines upstream and downstream of it are stopped or are idly operated, with considerable losses of time and materials.

In order to obviate these disadvantages solutions have been proposed which consist principally of locating buffer storage between two operating machines so that a momentary reduction in the receiving capacity of the receiving machine or a momentary increase in the delivery rate of the delivering machine are compensated for by transferring objects into said buffer storage. The buffers thus take on a synchronizing function which otherwise can only be obtained with very costly electronic regulating and control apparatus. Machines have already been proposed which include a rotating disc on to which the objects are transferred and from which they are individually withdrawn for transfer to the packing devices. Such machines, however, are limited in use according to the shape of the articles (in the majority of cases bottles) which must be uniform, and by their consistency. If the said transfer is to take place without hindrance, it is generally necessary for the articles to be storable at their arrival line, i.e. that they should be able to be grouped in a preestablished order so that they can be subjected to the action of mechanical means such as thrusting members. In other words they must not be stored staggered or random otherwise they create obstacles to the successive operation to which they are subjected. Products exist, mainly pharmaceutical, which are known commercially by the name of "blister" or "strips," semiflat sachets, whose shape does not permit accumulation, and are not able to be transferred into buffer stores.

There is also the need for grouping said products before packing them, for example superimposing them.

This phase of operation is generally carried out by auxiliary machinery which further worsens the economics of the plant.

SUMMARY OF THE INVENTION

An object of this invention is to obviate the above disadvantages by providing a device with which synchronization between two operating machines is obtained even when the articles of the process are not accumulable.

Another object of this invention is that of simultaneously obtaining a grouping of a preestablished number of articles.

Another object of the invention is the provision of a device of simple construction and consequent easy manufacture, of reliable operation, of simple and practical use and above all relatively low cost for the performance provided.

According to the invention there is provided a device for the transfer of articles from a delivering means to a receiving means moving at a different speed, in particular for nonaccumulable articles, which comprises a conveyor plane driven with continuous motion and arranged between said means, a series of containers arranged on said conveyor plane and able to slide on it, thrusting members operated synchronously with said delivering and receiving means and which push the articles from the delivering means into a container or from a container onto the receiving means, stops also being provided which hold said container at the delivering and receiving means during the filling and emptying phases of the containers respectively and which free them individually after said phases.

BRIEF DESCRIPTION OF THE DRAWINGS

The invention will better appear from the following detailed description of one preferred embodiment illustrated by way of example in the accompanying drawings in which.

DESCRIPTION OF PREFERRED EMBODIMENTS

Figure 1:
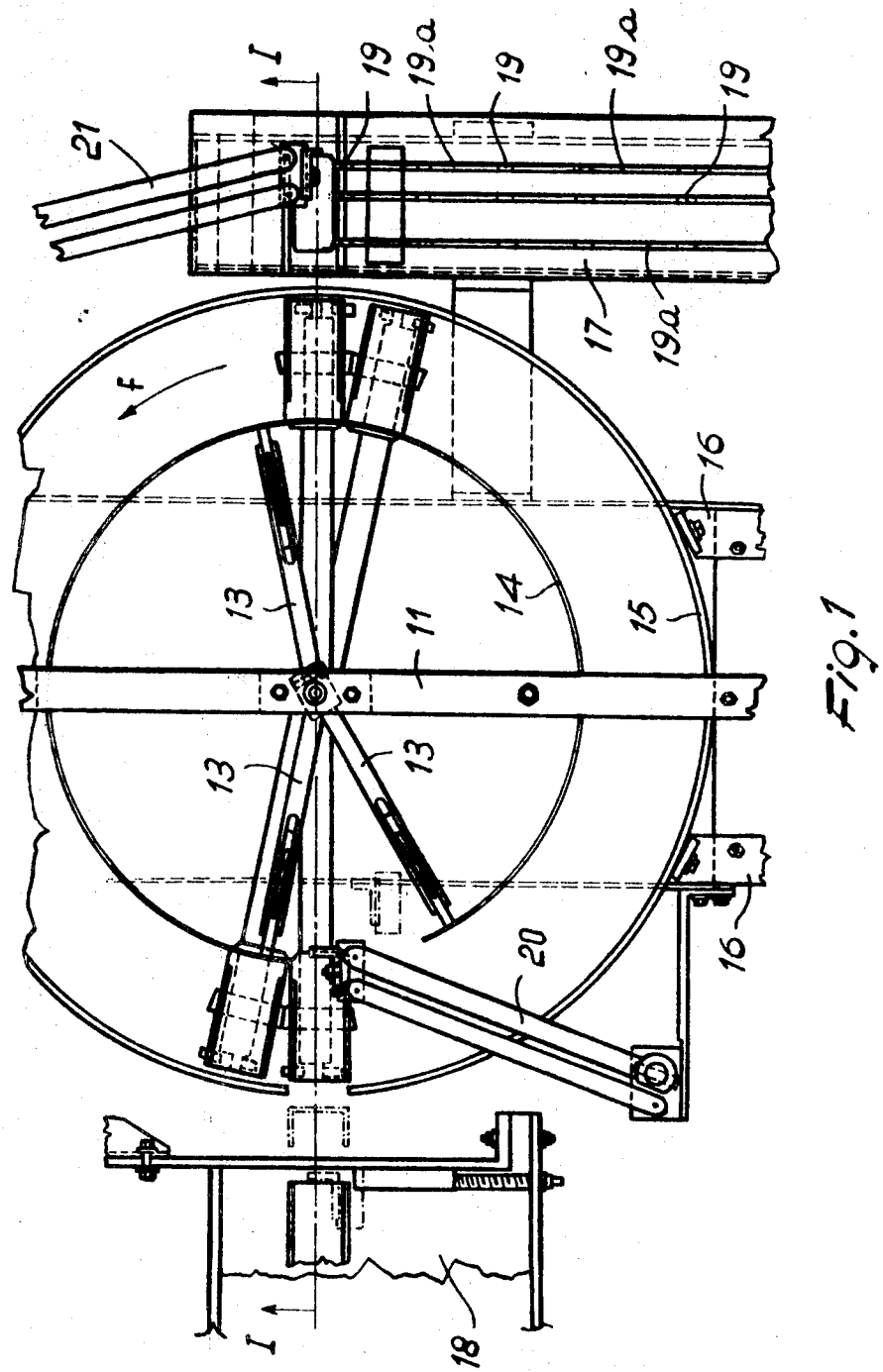
FIG. 1 is a partially diagrammatic plan view of a first embodiment of the device according to the invention.

Referring to said FIGS. in which similar elements or constructive details are given the same reference number, a conveyor plane is shown which comprises a plate 1 keyed onto the shaft 2 driven with uniform rotational motion in the direction indicated by the arrow $f$. The periphery of said plate contains annular grooves 3 on which a series of containers 4 open on two opposing side rest with the interpositioning of a plate member 5 and a distance piece 6, with which said containers are rigid.

On the shaft 2 a pin 7 is secured, on which are pivoted the ends of a series of arms 8 composed of blades, to each of which a container 4 is fixed at the opposite end. A bearing 9 housed in the base 10 of the device supports the shaft 2.

Diametrically above the plate 1 a crosspiece 11 is secured laterally to the base and supports three telescopic arms 13 of adjustable length by means of a pivot 12 coaxial to the shaft 2. A cylindrical wall 14 preferably of sheet metal is rigid with said arms 13 and, together with another similar wall 15 concentric to it and rigid with the angle irons 16 of the base, forms a circular corridor transversed by the containers 4. Two parallel conveyor belts 17 and 18 are situated laterally to the plate and on opposite sides of it. The conveyor belts can advance with intermittent or continuous motion and contain partitions 19 at regular intervals apart comprising teeth projecting from longitudinal channels 19A.

The arrival or delivery conveyor belt 17 is raised above the base of the container 4 for reasons which will be explained hereinafter, while the receiving conveyor belt 18 is at the same level as this latter.

Figure 2:
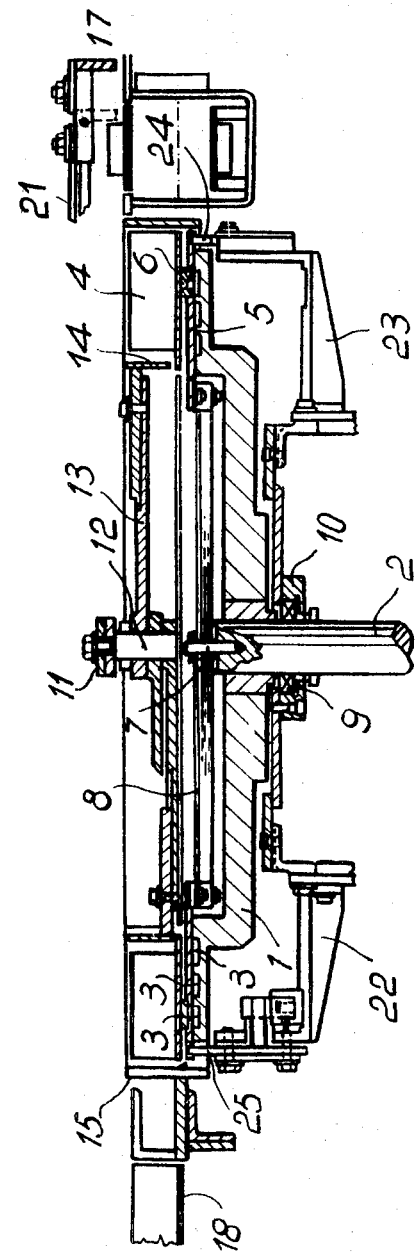
FIG. 2 is a lateral sectional view of the device taken on the line I–I of FIG. 1.

FIGS. 1 and 2 further shown two thrusting members generally indicated by the reference numerals 20 and 21, each comprising a system of two levers linked in the form of an articulated parallelogram oscillating in a horizontal plane and with movement synchronized with the intermittent advancement of the conveyor belts.

The structure of the device is completed by two brackets 22 and 23 fixed projecting from the base 10 and supporting intercepting or arresting means comprising a pair of levers 24 and 25 operated by a control synchronized with the thrusting members by photosensitive counters of known type and consequently not shown.

The operation of the device will be described hereinafter in relation to the transfer of nonaccumulable superimposable articles, as is the case of commercial articles known by the name of "blister" or "strips."

The product is conveyed by the belt 17 and urged during its arrest phase towards the container 4. This comes about by means of the thrusting member 21 being subjected to oscillating movement. During this interval the container 4 is held in a fixed position with respect to the rotating plate 1 by the interceptor level 24.

The intermittent advancing movements of the belt 17 and the relative oscillating movements of the thrusting member 21 are repeated for that number of times equal to the number of articles which it is desired to superimpose.

As previously noted the number of articles is sensed by a photoelectric cell which when the preestablished quantity has been grouped together transmits a control signal to the stop 24 so releasing it from engagement with the plate 5.

The container which up to this moment slides on the rotating plate 1, is now entrained by the plate along the corridor formed by the walls 14 and 15 and transferred to a position diametrically opposite, where it is stopped by the intercepting lever 25 and the contained articles are urged onto the receiving belt 18 by the thrusting member 20.

The number of containers linked to the shaft 2 can be chosen at will. It must, however, satisfy a previously calculated relationship between the delivery rate and receiving capacity of the operating machines arranged upstream and downstream of the device.

It is evident from what has been described that the accumulability which in themselves are not accumulable is attained by means of the containers side by side on each semicircular portion of the plate 1.

Constructional details and embodiments can be widely varied within the scope of the invention with respect to those described and illustrated by way of example.

Figure 3:
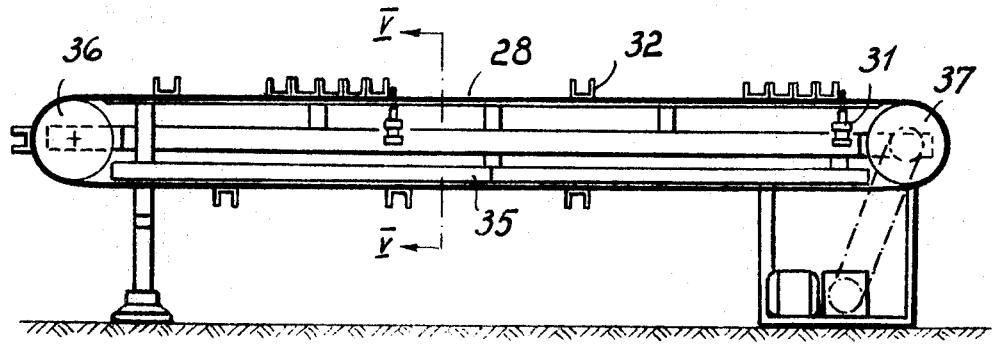
FIG. 3 is a lateral partially diagrammatic view of a second embodiment of the device according to the invention.
Figure 4:
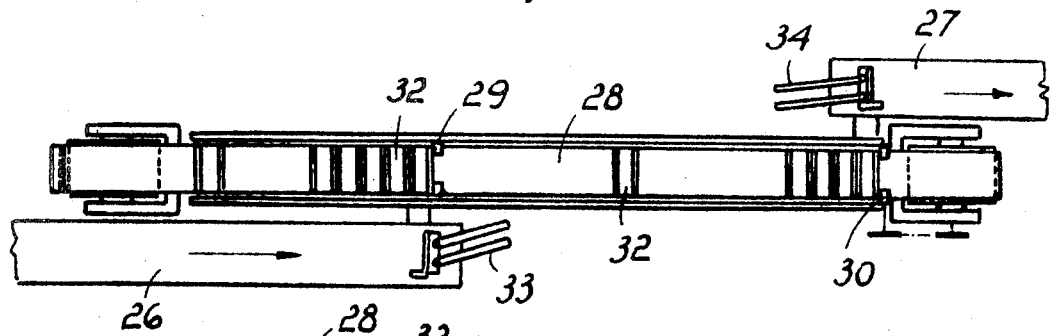
FIG. 4 is a plan view of the device of FIG. 3.
Figure 5:
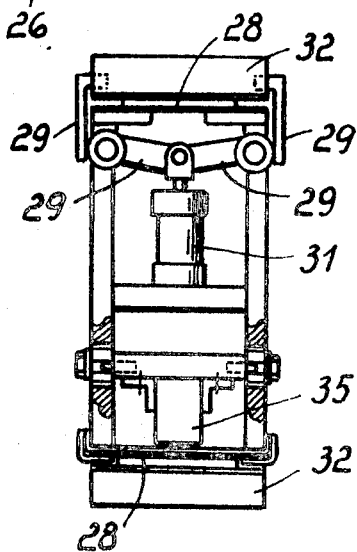
FIG. 5 is a sectional view taken on the line V–V of FIG. 3 on enlarged scale.

A further advantageous embodiment according to the invention is that shown in FIGS. 3—5. In these figures the delivery conveyor belt is indicated at 26 while the receiving belt is indicated at 27. Between them the conveyor plane is arranged which comprises a closed loop band 28 on the upper working portion of which all the operations mentioned in relation to the description of the embodiment of FIGS. 2 and 3 are carried out. Also in this embodiment intercepting means are provided comprising two pairs of rockers 29 and 30 which are driven by a pneumatic jack 31. Said rockers stop the advance of the containers 32 and their actuation is synchronized with the thrusting means 33 and 34 for the transfer of the articles from the delivery belt 26 onto said band 28 and from here onto the receiving belt 27. In order that the containers 32 remain attached on the band 28 during the return phase, when they are turned over, the lower portion of the band 28 runs over rails 35 of magnetic material secured by screw 36 to vertical rods of the device. Also the rollers 36, 37 about which the band 28 is wound are constituted of the same magnetic material. Advantageously the rails 35 may be vertically adjusted in order to obtain the proper magnetic attraction acting on the container 32.

I claim:

1. A device for transferring articles, in particular nonaccumulable articles, from a delivery means to a receiving means moving at different speed, which comprises a conveyor defining a plane driven with continuous motion and arranged between said means, a series of containers arranged on said conveyor plane and able to slide on it, thrusting members operated synchronously with said delivering and receiving means which push the articles from the delivering means into a container or from a container onto the receiving means, stops also being provided which hold said containers at the delivering and receiving means during the filling and emptying phases of the containers respectively and which free them individually after said phases.

2. A device as claimed in claim 1, in which said conveyor plane comprises a plate rotatably supported on a vertical shaft and arranged between said means, the containers being able to slide on a peripheral band of the plate and constrained coaxially with it.

3. A device as claimed in claim 1, in which said conveyor plane comprises a closed loop band which slides on magnetic rails able to retain the containers on the surface of the band during their return phase.

4. A device as claimed in claim 1, in which said conveyor plane comprises two parallel conveyor bands, with their working surfaces lying in one plane and driven by continuous opposite motion, thrusting members being provided which transfer the empty containers from the advancing band to the return band.

5. A device as claimed in claim 2, in which the delivering and receiving means comprise two parallel conveyor belts working with intermittent motion and situated substantially tangentially to the plate, of which the delivery belt is located at a level raised above the base of the container.

6. A device as claimed in claim 1, in which the thrusting members comprise a system of two levers linked in the form of an articulated parallelogram oscillating in a plane parallel with the plane of the belt conveyors, of which one lever is driven with pendular motion.

7. A device as claimed in claim 2, in which the containers are constrained with the axis of rotation of the rotating plate.